US008171724B2

(12) United States Patent
Xu et al.

(10) Patent No.: US 8,171,724 B2
(45) Date of Patent: May 8, 2012

(54) VEHICLE-BASED STRATEGY FOR REMOVING UREA DEPOSITS FROM AN SCR CATALYST

(75) Inventors: Lifeng Xu, Farmington Hills, MI (US); Williams Lewis Henderson Watkins, Toledo, MI (US); Shane Elwart, Washtenaw, MI (US); George Wade Graham, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1012 days.

(21) Appl. No.: 11/743,239

(22) Filed: May 2, 2007

(65) Prior Publication Data

US 2008/0271440 A1    Nov. 6, 2008

(51) Int. Cl.
*F01N 3/00* (2006.01)
*F01N 3/10* (2006.01)

(52) U.S. Cl. .................. 60/295; 60/286; 60/297; 60/301
(58) Field of Classification Search .................... 60/286, 60/274, 276, 295, 297, 301
See application file for complete search history.

(56) References Cited

U.S. PATENT DOCUMENTS

| 6,209,313 | B1 | 4/2001 | Wissler et al. | |
|---|---|---|---|---|
| 6,209,317 | B1 | 4/2001 | Hirota | |
| 6,823,660 | B2 | 11/2004 | Minami | |
| 6,823,663 | B2 * | 11/2004 | Hammerle et al. | 60/286 |
| 6,833,272 | B1 | 12/2004 | Binder et al. | |
| 6,871,490 | B2 | 3/2005 | Liang et al. | |
| 6,892,530 | B2 | 5/2005 | Montreuil et al. | |
| 6,928,506 | B2 | 8/2005 | Czech et al. | |
| 7,093,427 | B2 | 8/2006 | Van Nieuwstadt et al. | |
| 7,418,816 | B2 * | 9/2008 | Upadhyay et al. | 60/285 |
| 2004/0118108 | A1 * | 6/2004 | Ripper et al. | 60/286 |
| 2004/0139729 | A1 * | 7/2004 | Taylor et al. | 60/275 |
| 2007/0044456 | A1 | 3/2007 | Upadhyay et al. | |
| 2007/0044457 | A1 * | 3/2007 | Upadhyay et al. | 60/295 |
| 2007/0144152 | A1 * | 6/2007 | Lueders | 60/286 |

FOREIGN PATENT DOCUMENTS

GB    2435625    5/2005

OTHER PUBLICATIONS

ISR, Patent Corporation Treaty International Search Report for GB 0808016.0, Aug. 8, 2008, 2 pages.

* cited by examiner

*Primary Examiner* — Thomas Denion
*Assistant Examiner* — Audrey K Bradley
(74) *Attorney, Agent, or Firm* — Julia Voutyras; Alleman Hall McCoy Russell & Tuttle LLP (57) ABSTRACT

A method is provided for controlling regeneration of an SCR catalyst. The method includes coordinating the regeneration duration and temperature (e.g., longer/shorter regenerations and/or lower/higher temperatures) to the urea deposit loading. In this way, improved regeneration may be achieved due to the particular nature of urea deposits on SCR catalysts.

15 Claims, 5 Drawing Sheets

VEHICLE-BASED STRATEGY FOR REMOVING UREA DEPOSITS FROM AN SCR CATALYST

FIELD

The present application relates to a system and method for improving the performance of a vehicle's exhaust gas aftertreatment system; specifically the application relates to a system and method for regenerating a urea-based selective catalytic reduction (SCR) catalyst to improve NOx conversion efficiency.

BACKGROUND

Vehicles powered with diesel engines have to be equipped with lean exhaust aftertreatment devices such as a urea-based Selective Catalytic Reduction (SCR) catalyst to reduce NOx emissions. The urea-based SCR catalyst requires the injection of urea to provide ammonia ($NH_3$) as a reductant for NOx reduction. The ammonia generation from urea decomposition follows mainly two steps, as shown below:

The first step (1) is a thermal decomposition reaction and the second step (2) is a hydrolysis reaction. The thermal decomposition of urea is slow and is the rate limiting step at a temperature below 300° C. Therefore, when the exhaust temperature is below 300° C., the spray of urea solution to the SCR catalyst may be deposited mostly as urea related compounds on the SCR without being fully decomposed.

Diesel exhaust gas temperature may be low (e.g., less than 300° C.) when a diesel vehicle is driven in urban driving cycles. Thus, urea related deposits may be formed on the SCR catalyst. The urea related deposits may plug pores in the washcoat and reduce the catalyst surface area and the catalyst's activity. Further, clogging on the catalyst may increase the back pressure over the catalyst, and thus negatively impact engine performance and increase fuel consumption.

U.S. Pat. No. 6,892,530 discloses a method to regenerate a urea-based SCR catalyst by maintaining its temperature above the boiling point of hydrocarbons to remove hydrocarbon deposits. However, the inventors herein have recognized that the above approach may not remove urea related deposits sufficiently. For example, the temperature and time interval for removing hydrocarbon deposits used in the '530 patent may not be effective to remove the urea-based deposits.

SUMMARY

According to one aspect, a method for operating an aftertreatment device coupled downstream of an internal combustion engine is provided. The aftertreatment device includes a urea-based selective catalyst reduction (SCR) catalyst. The method comprises establishing a threshold urea deposit accumulation for regeneration of the SCR catalyst; determining whether the threshold urea deposit accumulation in the SCR catalyst has been met; and in response to the determination, regenerating the SCR catalyst by maintaining the SCR catalyst at or above a predetermined regeneration temperature for a predetermined interval. In one example, the interval and/or predetermined temperature may be varied with an amount of urea deposit.

According to another aspect, a method to regenerate a urea-based selective catalyst reduction (SCR) catalyst coupled downstream of an internal combustion engine is provided. The method comprises estimating urea deposit accumulation in the SCR catalyst to determine a timing for regeneration of the SCR catalyst to remove the urea deposit accumulation; raising a temperature of the SCR catalyst to a predetermined temperature and maintaining the predetermined temperature for a predetermined time interval to regenerate the SCR catalyst; and adjusting an exhaust flowrate entering the SCR catalyst to improve heat transfer in the SCR catalyst and removal of the urea deposit accumulation.

According to yet another aspect, a system for a vehicle comprises an internal combustion engine; a urea based selective catalyst reduction (SCR) catalyst coupled downstream of the internal combustion engine; and a controller configured to adjust operating parameters to regenerate the SCR catalyst, where the controller varies a temperature at which the SCR catalyst is regenerated with an amount of urea deposited on the SCR catalyst, and where the controller varies a duration for which the SCR catalyst is regenerated with said amount of urea deposited. For example, by coordinating the regeneration duration and temperature (e.g., longer/shorter regenerations and/or lower/higher temperatures) to the urea deposit loading, improved regeneration may be achieved due to the particular nature of urea deposits on SCR catalysts.

DETAILED DESCRIPTION

Figure 1A:
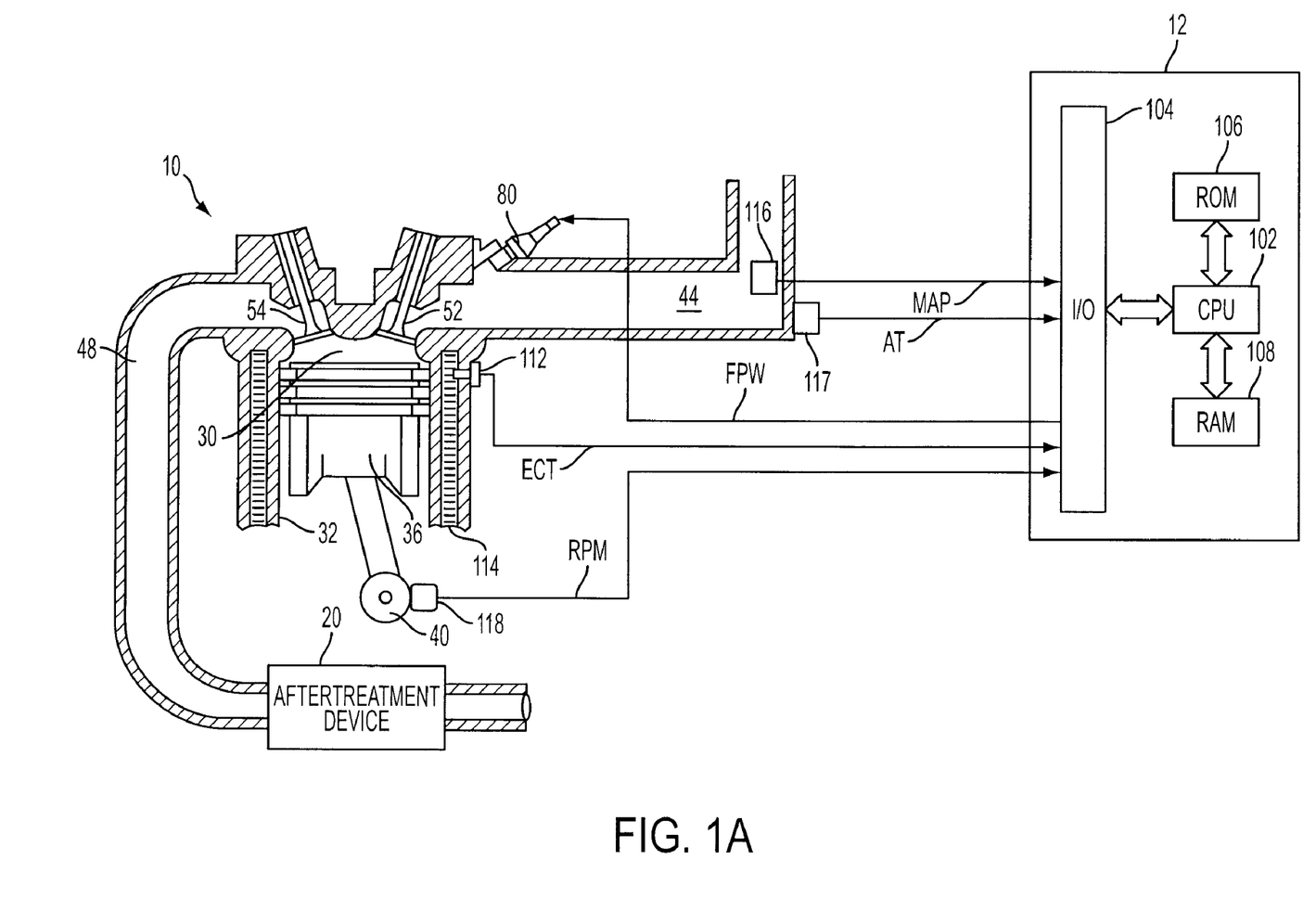
FIG. 1A is a schematic depiction of an exemplary embodiment of an engine.
Figure 1B:
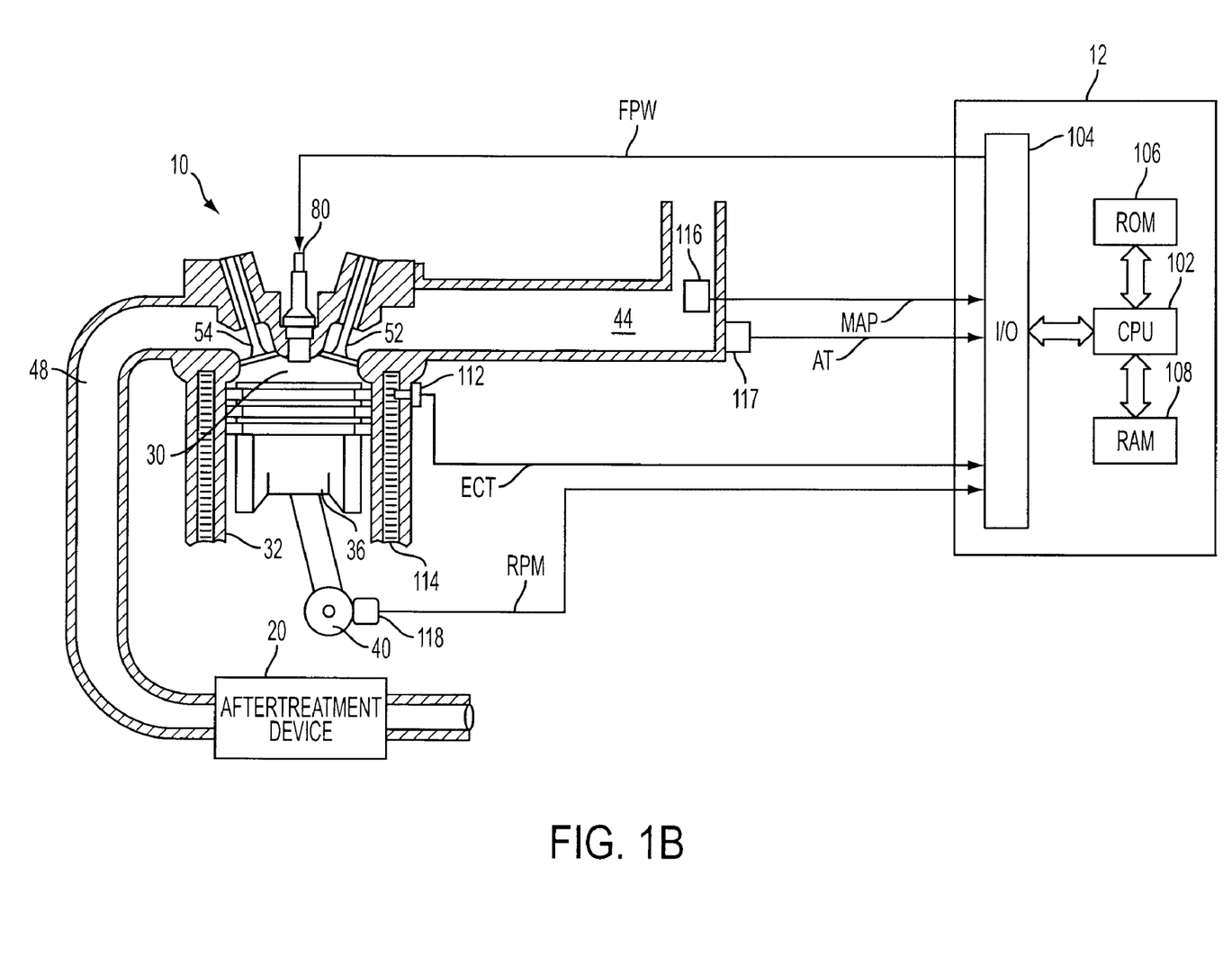
FIG. 1B is an alternative exemplary embodiment of an engine.

FIGS. 1A and 1B are schematic diagrams of an engine. As shown in FIG. 1A, internal combustion engine 10, comprising a plurality of cylinders, one cylinder of which is shown in FIG. 1A, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Intake manifold 44 is also shown having fuel injector 80 coupled thereto for delivering liquid fuel in proportion to the pulse width of signal FPW from controller 12. Both fuel quantity, controlled by signal FPW and injection timing are adjustable by controller 12, described below. Fuel is delivered to fuel injector 80 by a fuel system (not shown) including a fuel tank, fuel pump, and fuel rail (not shown).

Controller 12 is shown in FIG. 1A as a microcomputer including microprocessor unit 102, input/output ports 104, read-only memory 106, random access memory 108, and a data bus. Controller 12 is shown receiving various signals from sensors coupled to engine 10, in addition to those signals previously discussed, including engine coolant temperature (ECT) from temperature sensor 112 coupled to cooling sleeve 114, a measurement of manifold pressure (MAP) from pressure sensor 116 coupled to intake manifold 44, a measurement (AT) of manifold temperature from temperature sensor 117, an engine speed signal (RPM) from engine speed sensor 118 coupled to crankshaft 40. An aftertreatment device 20 is coupled to an exhaust manifold 48 and is described with particular reference to FIG. 2.

Referring now to FIG. 1B, an alternative embodiment is shown where engine 10 is a direct injection engine with injector 80 located to inject fuel directly into cylinder 30.

Figure 2:
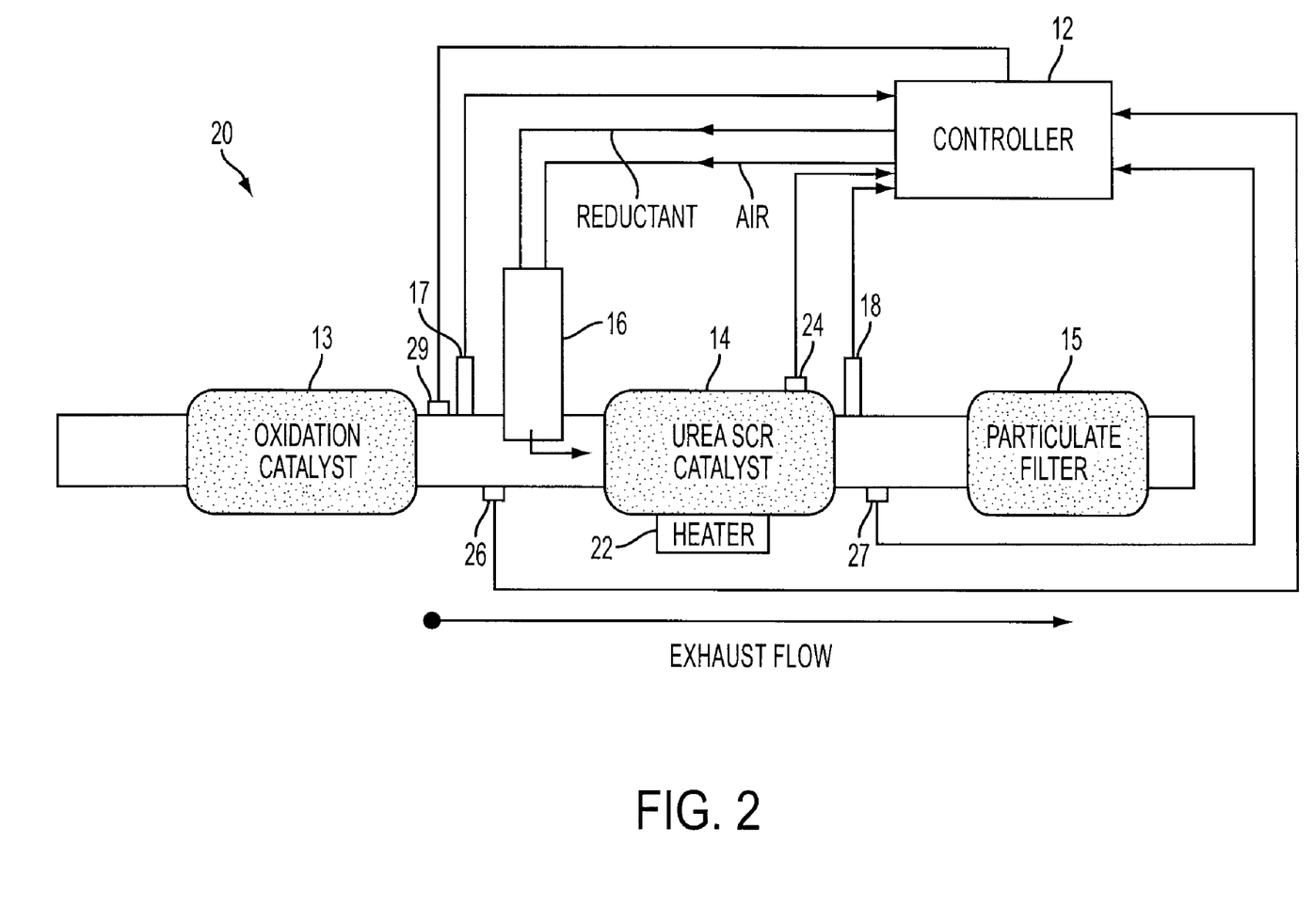
FIG. 2 is a schematic depiction of an aftertreatment device coupled downstream of an internal combustion engine.

Referring now to FIG. 2, the aftertreatment device 20 comprises a urea-based Selective Catalytic Reduction (SCR) catalyst 14, which is capable of reducing NOx in an oxygen rich environment. Reductant, such as aqueous urea, is stored in a storage vessel (not shown) and delivered through a reductant delivery system 16 coupled to exhaust system upstream of SCR catalyst 14. The reductant is metered out by a pump through a control valve, where both the pump and the valve are controlled by controller 12. Alternatively, any other suitable means known to those skilled in the art to supply reductant to an exhaust gas aftertreatment device may be used. A heater 22 may be coupled to the SCR catalyst to provide heat for a regeneration of the SCR catalyst.

Controller 12 is configured to control an operation of the SCR catalyst, such as regeneration, based on information measured by sensors or based on estimated parameters. For example, the temperature of the SCR catalyst may be measured by a temperature sensor 24, and may be used as one of the parameters to estimate the urea deposit accumulation or to control the SCR catalyst regeneration, etc. One or more NOx sensors, such as an upstream NOx sensor 17 and a NOx sensor 18 down stream of the SCR catalyst, are coupled in the path of the exhaust gas entering and exiting the SCR catalyst. The outputs of these sensors are read by controller 12 and may be used to estimate urea deposit on the SCR catalyst.

While typically two NOx sensors are provided, it will be appreciated that only one NOx sensor may be provided. For example, in one embodiment, only downstream NOx sensor 18 is provided and the controller 12 is configured to estimate the urea deposit on the SCR catalyst based on the output from downstream NOx sensor 18 along with one or more engine operation and urea injection parameters. For example, engine speed, load, exhaust gas temperature or any other parameter known to those skilled in the art to affect engine NOx production, may be used by controller 12 in the estimation of NOx entering the SCR catalyst. Further, a pressure drop across the SCR catalyst may be used by controller 12 to estimate the urea deposit. One or more pressure sensors 26 and 27 may be used to measure the pressure drop. Furthermore, an exhaust flow rate entering the SCR catalyst may be measured by a flow meter 29.

Oxidation catalyst 13 is coupled upstream of the SCR catalyst and may be a precious metal catalyst, preferably one containing platinum. The oxidation catalyst exothermically combusts hydrocarbons (HC) in the incoming exhaust gas from the engine thus supplying heat to rapidly warm the SCR catalyst 14. The temperature of the SCR catalyst may be raised by controller 12 through retarding injection timing, increasing EGR and intake throttling, or any other suitable means known to those skilled in the art to increase the temperature of the exhaust gas. Alternatively, in a direct injection engine as shown in FIG. 1B, extra hydrocarbons may be delivered to the oxidation catalyst for the SCR catalyst warm-up by in-cylinder injection during either or both of a power or exhaust stroke of the engine. Particulate filter 15 is coupled downstream of the SCR catalyst 14. As described below, heat from particulate filter regeneration may be used to heat the SCR catalyst.

It should be noted that various embodiments for the aftertreatment device may be available. For example, although depicted downstream, it will be appreciated that particulate filter 15 may be disposed upstream of SCR catalyst.

Figure 3A:
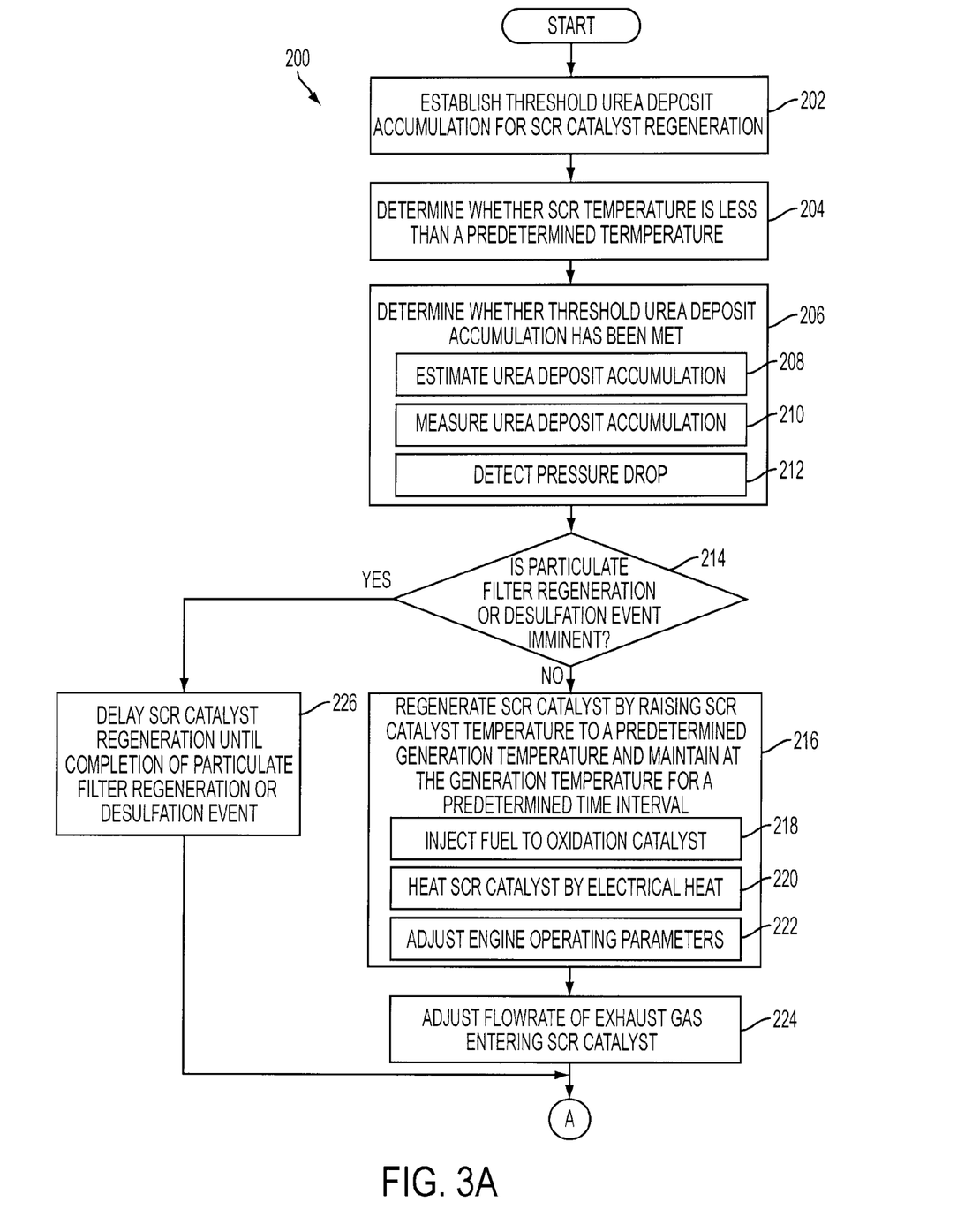
FIG. 3 illustrates an exemplary method 200 for operating an aftertreatment device coupled downstream of an internal combustion engine according to one embodiment of the present disclosure.
Figure 3B:
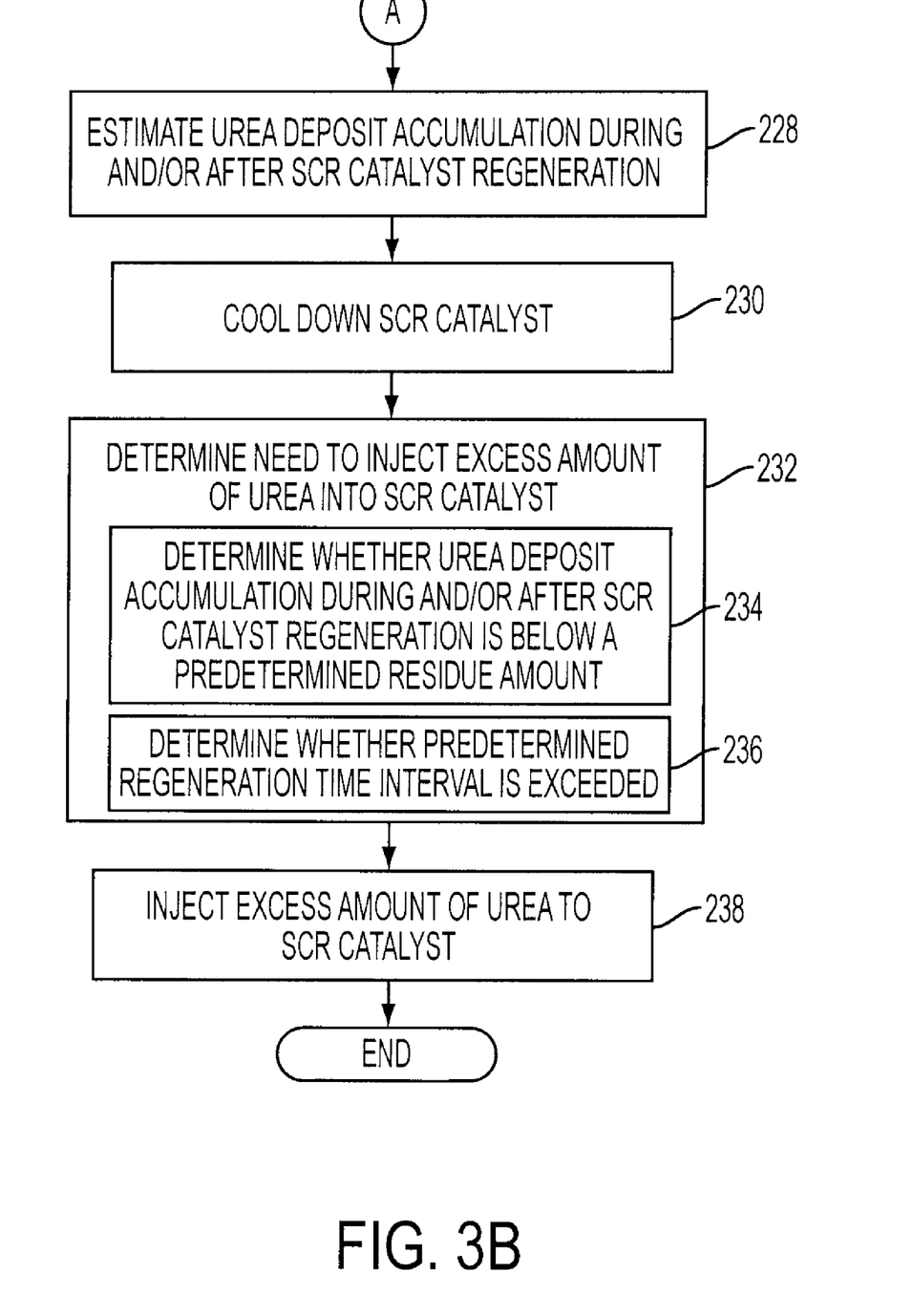

FIG. 3 illustrates an exemplary method 200 for operating an aftertreatment device coupled downstream of an internal combustion engine according to one embodiment of the present disclosure. As described above, the aftertreatment device may include a urea-based SCR catalyst, an oxidation catalyst and a particulate filter. Method 200 may be used to regenerate the SCR catalyst by removing urea deposit or urea deposit accumulation. First, at 202, the method includes establishing a threshold urea deposit accumulation for regeneration of the SCR catalyst. As described above, urea deposit accumulation may plug the pores in the washcoat of the SCR catalyst and reduce the effective catalyst area and catalyst activities. The threshold urea deposit accumulation may be a level at which the SCR catalyst cannot achieve a desired efficiency to remove NOx.

Next, at 204, the method determines whether a temperature of the SCR catalyst is less than a predetermined temperature. As described above, the first step of ammonia generation from urea decomposition is a thermal decomposition reaction. Low temperature may decrease the decomposition rate of urea and cause the formation of urea related solid compounds. As urea solution is sprayed onto the SCR catalyst, urea deposit accumulation may be formed at a low exhaust temperature. For example, when the exhaust temperature is below 300° C., urea deposits may be formed, which may clog the catalyst. Thus, the method may use a temperature as a threshold to determine a need for SCR regeneration associated with the urea deposit accumulation. In some embodiments, the predetermined temperature may be in the range of 300-350° C. Preferably, the predetermined temperature may be 350° C. When the temperature is below 350° C., urea deposits may vaporize slowly and tend to accumulate on the SCR catalyst. Alternatively, step 202 may proceed to step 206 directly without step 204. The SCR catalyst regeneration may be determined by threshold urea deposit accumulation.

Further, it should be noted that when the temperature is below a certain level, urea injected into the SCR catalyst may not be decomposed at a rate sufficiently high enough to be used as a reductant. Thus, in some embodiments, urea injection may be disabled at or below a low exhaust temperature, such as 165° C.

Next, at 206, the method determines whether the threshold urea deposit accumulation has been met. Determining that the threshold urea deposit accumulation on the SCR catalyst has been met includes estimating urea deposit accumulation and determining that the estimated urea deposit accumulation meets or exceeds the threshold urea deposit accumulation. Various approaches may be used to estimate urea deposit accumulation. For example, at 208, determining whether the threshold has been met may be accomplished by estimating the urea deposit accumulation based on operating conditions of the SCR catalyst. For example, the urea deposit accumulation may be a function of operating variables, such as operating temperature, urea flow rate, exhaust flow rate, exhaust pressure, pressure differences across the SCR catalyst, ammonia to NOx ratio (a parameter for controlling amount of urea injected into the exhaust system), etc. Thus, the urea deposit accumulation may be estimated by a controller based on one or more variables described above.

Alternatively, at 210, determining whether the threshold has been met may be accomplished by estimating the urea deposit accumulation. Because the urea deposit accumulation may affect the efficiency of the SCR catalyst, the urea deposit accumulation may be a function of NOx emissions. Thus, the urea deposit accumulation may be estimated according to an output of NOx sensors. For example, NOx conversion efficiency may be estimated based on an output from NOx sensor 17 upstream of the SCR catalyst as shown in FIG. 2 and an output from NOx sensor 18 downstream of the SCR catalyst also shown in FIG. 2. Alternatively, NOx sensor 17 may be eliminated and the amount of NOx in the exhaust gas mixture entering the SCR catalyst can be inferred based on engine speed, load, exhaust gas temperature or any other suitable parameter known to those skilled in the art to affect engine NOx production. Alternatively, or additionally, one or more of the operating variables, such as operating temperature, urea flow rate, exhaust flow rate, exhaust pressure, pressure differences across the SCR catalyst, equivalence ratio, etc. may be used along with the NOx sensor outputs in the estimation of urea deposit accumulation.

Alternatively, at 212, determining whether the threshold has been met may be accomplished by detecting a pressure drop across the SCR catalyst. Because the urea deposit accumulation may increase the back pressure over the catalyst, a pressure drop across the SCR catalyst may correspond with the urea deposit accumulation in the SCR catalyst. Thus, determining that the threshold urea deposit accumulation in the SCR catalyst has been met may include detecting whether the pressure drop across the SCR catalyst meets or exceeds the predetermined pressure drop threshold corresponding to the threshold urea deposit accumulation.

Next, at 214, the method determines whether particulate filter regeneration or a desulfation event is imminent. If the answer to step 214 is "No", SCR regeneration is initiated at 216. The method includes raising the temperature of the SCR catalyst to a predetermined generation temperature and maintaining the regeneration temperature for a predetermined time. Urea deposits may vaporize slowly at temperatures at 350° C. or below. On the other hand, urea deposit may vaporize quickly at temperatures at 400° C. or greater. In some embodiments, the regeneration temperature may be in the range of 360-450° C. At this temperature range, urea deposits can be significantly removed.

The increase of the SCR catalyst temperature may be accomplished by various methods. At 218, raising the temperature may be accomplished by injecting fuel into the oxidation catalyst to generate an exothermic reaction, which may generate sufficient heat to raise the SCR catalyst temperature. The amount of fuel injected and duration of the injection may be determined by a prestored map based on engine operating conditions, such as engine speed, load, catalyst temperature, exhaust gas temperature, etc., or any other suitable method. Alternatively, at 220, the temperature may be raised by heating SCR catalyst using an electrical heater. At 222, raising the temperature of the SCR catalyst may be accomplished by adjusting engine related measures, such as retardation of injection timing, increasing exhaust gas recirculation (EGR), closing an intake throttle, etc.

The duration of the regeneration may be determined such that the urea deposit accumulation may be removed to an extent that any remaining urea deposits would not affect the performance of the SCR catalyst. In some embodiments, the regeneration time may be at least two minutes, which is sufficient time for effective SCR catalyst regeneration.

Next, at 224, the method may include adjusting the flow rate of exhaust gas entering the SCR catalyst. In some conditions, exhaust flow rate or space velocity may be decreased to improve the effectiveness of removing the urea deposit on the SCR catalyst.

If, on the other hand, at 214 the answer is "yes", at 226, the method includes delaying the SCR catalyst regeneration until the completion of the particulate filter regeneration or the desulfation event. The temperature for the particulate filter regeneration and the desulfation event typically is greater than 600° C. Thus, the heat generated in the exhaust system due to the particulate filter regeneration or the desulfation event may clean the urea deposit off the SCR catalyst. It should be noted that urea deposit accumulation may occur quickly in most of the low operation temperature conditions (e.g., temperature <300° C.). Therefore, the particulate filter regeneration or the desulfation event may not remove the urea deposit accumulation as desired. The SCR catalyst regeneration may occur more frequently than the particulate filter regeneration or the desulfation event. Because the particulate filter regeneration or the desulfation event is taken into account, the instance of the regeneration required to remove the urea deposit may be reduced. Thus, energy used for the regeneration of the SCR catalyst may be decreased, and the duration of normal operation of the SCR catalyst may be increased.

Continuing from either step 226 or step 224, at 228, the method may include estimating urea deposit accumulation during and/or after the SCR regeneration. In some embodiments, the following equation may be used to make the estimation:

The urea deposit accumulation (during and/or after regeneration)=estimated or measured urea deposit accumulation before the regeneration−estimated amount of urea deposit removed.

The urea deposit accumulation may be estimated or measured using the approaches described in steps 208 and 210, respectively. The amount of urea deposit removed by the regeneration process may be estimated, similarly.

After regeneration is completed, at 230, the method may include cooling down the SCR catalyst. Next, at 232, the method includes determining a need to inject an excess amount of urea into the SCR catalyst. This determination may include determining whether the urea deposit accumulation during and or after the SCR regeneration is below a predetermined residue amount at 234. The predetermined urea deposit amount at 234 may be a level at which the SCR catalyst may not perform as desired because the amount of stored ammonia is not suitable for desired NOx reduction. Alternatively, the determination may include determining whether the predetermined regeneration time interval is exceeded at 236.

Typically, urea solution needs to be injected continuously, including during regeneration, into the SCR catalyst to remove the urea deposits. The exception may be a period during a particulate filter regeneration or desulfation event where the SCR temperature is above 600° C. This is because the SCR catalyst may not have activity at temperatures above 650° C. In some embodiments, the SCR catalyst may have preferred (or best) performance for NOx reduction at a temperature (e.g., less than 300° C.) when the SCR catalyst stores sufficient ammonia ($NH_3$) which comes from urea decomposition. However, the stored ammonia may be decreased during regeneration as the SCR catalyst is heated to the regeneration temperature (e.g., in the range of 360 to 450° C.). Thus, an excess amount of urea injection may be desired after SCR regeneration.

Thus, at 238, the method includes injecting the excess amount of urea into the SCR catalyst. The excess amount of urea injection may be determined based on engine operating conditions, such as, speed, load, catalyst temperature, mass airflow, etc.

It should be noted that steps 224 to 238 may be performed at some conditions where the temperature of the SCR catalyst is closed to the regeneration temperature by opportunity. At these conditions, the excess amount of urea may be needed to maintain the desired NOx reduction or conversion efficiency in the SCR catalyst.

The method according to the present disclosure may increase NOx conversion efficiency of the SCR catalyst by removing urea related deposits through regeneration. The engine performance and fuel economy may also be improved by reducing the back pressure increase due to clogs by urea deposits. Further, the method takes into account of the removal of urea deposit by the particulate filter regeneration or the desulfation event, thereby reducing the time required for SCR catalyst regeneration based on urea deposit accumulation. Moreover, the NOx breakthrough during cool down after regeneration (e.g., SCR catalyst regeneration, particulate filter regeneration) may be minimized by adjusting the ammonia injection after a regeneration event.

As will be appreciated by one of ordinary skill in the art, the specific routines and block diagrams described above in the flowcharts may represent one or more of any number of processing strategies such as, event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the disclosure, but is provided for ease of illustration and description. Although not explicitly illustrated, one of ordinary skill in the art will recognize that one or more of the illustrated steps or functions may be repeatedly performed depending on the particular strategy being used. Further, these Figures graphically represent code to be programmed into the computer readable storage medium in controller 12.

It will be appreciated that the processes disclosed herein are exemplary in nature, and that these specific embodiments are not to be considered in a limiting sense, because numerous variations are possible. The subject matter of the present disclosure includes all novel and non-obvious combinations and subcombinations of the various camshaft and/or valve timings, fuel injection timings, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the injection and valve timing and temperature methods, processes, apparatuses, and/or other features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a vehicle, comprising:
   an engine;
   a urea-based selective catalyst reduction (SCR) catalyst coupled downstream of the engine; and
   a controller configured to adjust operating parameters to regenerate the SCR catalyst, where the controller varies each of a duration (longer/shorter) for which the SCR catalyst is regenerated and a temperature (lower/higher) at which the SCR catalyst is regenerated based on an amount of urea deposits accumulated on the SCR catalyst prior to regeneration.

2. The system of claim 1, the controller further configured to determine that a threshold for removal of urea deposit accumulation on the SCR catalyst has been met, and wherein upon making such determination, the controller is further configured to regenerate the SCR catalyst at a predetermined temperature for a predetermined time in response to the determination, and wherein the threshold is based on a pressure drop across the SCR catalyst.

3. A system for a vehicle, comprising:
   an engine with a urea-based selective catalyst reduction (SCR) catalyst and a particulate filter coupled downstream thereof; and
   a controller configured to regenerate the SCR catalyst, vary each of a SCR regeneration duration (longer/shorter) and a SCR regeneration temperature (lower/higher) based on an accumulated urea deposit amount on the SCR catalyst prior to regeneration, and delay initiation of SCR regeneration based on completion of a particulate filter regeneration.

4. A method for operating an aftertreatment device coupled downstream of an internal combustion engine, the aftertreatment device including a urea-based selective catalyst reduction (SCR) catalyst and a particulate filter, the method comprising:
   establishing a threshold urea deposit accumulation for regeneration of the SCR catalyst;
   determining that the threshold urea deposit accumulation in the SCR catalyst has been met;
   in response to the determination, regenerating the SCR catalyst by maintaining the SCR catalyst at a predetermined regeneration temperature for a predetermined interval, and
   after determining that the threshold urea deposit accumulation in the SCR catalyst has been met, delaying the SCR regeneration until a regeneration performed in the particulate filter is completed.

5. The method of claim 4, wherein determining that the threshold urea deposit accumulation in the SCR catalyst has been met includes measuring NOx emissions using a NOx sensor and one of an operating temperature, a urea flow rate, an exhaust flow rate, an exhaust pressure, and a pressure difference across the SCR catalyst.

6. The method of claim 4, wherein determining that the threshold urea deposit accumulation in the SCR catalyst has been met includes detecting that a pressure drop across the SCR catalyst meets or exceeds a predetermined pressure drop threshold corresponding to the threshold urea deposit accumulation.

7. The method of claim 4, wherein the predetermined regeneration temperature is about 360-450° C.

8. The method of claim 4, wherein the predetermined interval is at least two minutes.

9. The method of claim 4, wherein a temperature of the SCR catalyst is raised to and maintained at the regeneration temperature by heating the SCR catalyst using a SCR catalyst heater.

10. The method of claim 4, wherein the aftertreatment device further includes an oxidation catalyst, wherein a temperature of the SCR catalyst is raised to and maintained at the regeneration temperature by injecting fuel to the oxidation catalyst to generate an exothermic reaction.

11. The method of claim 4, further comprising injecting an excess amount of urea to the SCR catalyst when the temperature is cooled down after the regeneration upon a determination that the predetermined regeneration interval is exceeded, wherein the excess amount of urea injection is determined based on operating conditions of the SCR catalyst.

12. The method of claim 4, wherein determining that the threshold urea deposit accumulation in the SCR catalyst has been met includes:
  estimating urea deposit accumulation based on operation conditions of the SCR catalyst, and
  determining that the estimated urea deposit accumulation meets or exceeds the threshold urea deposit accumulation.

13. The method of claim 12, wherein the operating conditions include one of an operating temperature, a urea flow rate, an exhaust flow rate, an exhaust pressure, and a pressure difference across the SCR catalyst.

14. A method for operating an aftertreatment device coupled downstream of an internal combustion engine, the aftertreatment device including a urea-based selective catalyst reduction (SCR) catalyst, the method comprising:
  establishing a threshold urea deposit accumulation for regeneration of the SCR catalyst;
  determining that the threshold urea deposit accumulation in the SCR catalyst has been met;
  in response to the determination, regenerating the SCR catalyst by maintaining the SCR catalyst at a predetermined regeneration temperature for a predetermined interval; and
  injecting an excess amount of urea to the SCR catalyst upon an estimation that urea deposit accumulation after the regeneration is below a predetermined residue amount when catalyst temperature is cooled down after the regeneration, wherein the excess amount of urea injection is determined based on operating conditions of the SCR catalyst.

15. The method of claim 14, wherein the estimation includes estimating an amount of urea deposit removed by regeneration and subtracting the estimated amount of urea deposit removed from an estimated or measured urea deposit accumulation before the regeneration, to obtain the estimation of urea deposit accumulation after the regeneration.

* * * * *